United States Patent
Hogan et al.

(10) Patent No.: US 10,002,428 B2
(45) Date of Patent: Jun. 19, 2018

(54) METHOD AND SYSTEM FOR IDENTIFYING BLEEDING

(71) Applicant: Ottawa Hospital Research Institute, Ottawa (CA)

(72) Inventors: Matthew Hogan, Ottawa (CA); Dariush Dowlatshahi, Ottawa (CA)

(73) Assignee: Ottawa Hospital Research Institute, Ottawa (CA)

( * ) Notice: Subject to any disclaimer, the term of this patent is extended or adjusted under 35 U.S.C. 154(b) by 71 days.

(21) Appl. No.: 15/364,741

(22) Filed: Nov. 30, 2016

(65) Prior Publication Data

US 2017/0154422 A1    Jun. 1, 2017

Related U.S. Application Data

(60) Provisional application No. 62/261,604, filed on Dec. 1, 2015.

(51) Int. Cl.
| | |
|---|---|
| *G06K 9/00* | (2006.01) |
| *G06T 7/00* | (2017.01) |
| *G06K 9/62* | (2006.01) |
| *G06T 5/30* | (2006.01) |
| *G06T 5/00* | (2006.01) |

(52) U.S. Cl.
CPC .......... *G06T 7/0016* (2013.01); *G06K 9/6219* (2013.01); *G06K 9/6226* (2013.01); *G06T 5/001* (2013.01); *G06T 5/30* (2013.01); *G06K 2209/05* (2013.01); *G06T 2207/10076* (2013.01); *G06T 2207/20032* (2013.01); *G06T 2207/30016* (2013.01); *G06T 2207/30104* (2013.01)

(58) Field of Classification Search
USPC ....................................................... 382/131
See application file for complete search history.

(56) References Cited

U.S. PATENT DOCUMENTS

| | | | |
|---|---|---|---|
| 4,793,357 A * | 12/1988 | Lindstrom | A61B 6/481 600/431 |
| 6,898,453 B2 | 5/2005 | Lee | |
| 8,523,779 B2 | 9/2013 | Taylor et al. | |
| 2012/0155735 A1* | 6/2012 | Friedman | A61B 5/0275 382/131 |
| 2012/0184840 A1* | 7/2012 | Najarian | G06K 9/629 600/408 |
| 2013/0303900 A1* | 11/2013 | Nowinski | A61B 5/7275 600/425 |
| 2016/0019435 A1* | 1/2016 | Kitamura | A61B 6/032 382/180 |

* cited by examiner

*Primary Examiner* — Jerome Grant, II
(74) *Attorney, Agent, or Firm* — Borden Ladner Gervais LLP

(57) ABSTRACT

A three-dimensional image of a patient is generated in time; blood vessels site voxels are compared to a model arterial and venous signals; clusters of voxels are separated so that ones that have spatial growth over time are determined to be bleeding sites.

20 Claims, 15 Drawing Sheets

METHOD AND SYSTEM FOR IDENTIFYING BLEEDING

CROSS-REFERENCE TO RELATED APPLICATIONS

This application claims the benefit of U.S. Provisional Application No. 62/261,604, filed Dec. 1, 2015, which is herein incorporated by reference.

FIELD

The present disclosure relates to the field of medical imaging-based diagnostic techniques.

BACKGROUND

When a patient is rushed to the hospital with a suspected injury, he or she may undergo one or more diagnostic tests. While modern diagnostic techniques and medical imaging technology can determine if a patient has bled into a body cavity, it is difficult to reveal in a timely manner whether a patient is experiencing ongoing internal hemorrhaging. The inability to quickly determine that a patient is actively hemorrhaging means that the patient may not be treated in time for this condition and this in turn may lead to serious injury or even death.

It is, therefore, desirable to provide a method and system for identifying active or on-going internal bleeding and the site of blood leakage in a patient.

SUMMARY

The present disclosure describes a method and system for identifying active and ongoing bleeding in a patient. The method and system may generate the determination in an automated fashion. By identifying patient bleeding without necessitating the skill and judgment of a physician, hospitals may more rapidly and effectively provide better individual treatment to patients affected with internal bleeding.

In a first aspect, the present disclosure provides a method for identifying bleeding in the brain of a patient from a four-dimensional data set of a CT scan following intravascular administration of an x-ray contrast dye. The method comprises identifying blood vessel and active bleeding sites within the identified tissue of interest as regions showing large signal change, or variability, following rapid administration of contrast agent. The non-bleed and non-vessel sites in the data set, that is those image voxels having limited contrast signal or having non-physiologic or excessive signals, are removed. For each remaining cluster, the onset time of signal change is identified and used to generate spatially and temporally contiguous sets of voxels in the four-dimensional data set. These clusters describe voxels having both a spatial and temporal relationship. Each cluster is averaged over its spatial dimension to generate an average time signal value for the cluster. The average signal is correlated with the signal arising from previously identified intact vascular sites and those clusters identified to be highly correlated with a normal vascular signal removed. The remaining clusters are analyzed to identify those clusters showing spatial growth over time, which represents the sites of active bleeding.

In another aspect, the present disclosure more generally provides a method for identifying bleeding in a patient, the method comprising: receiving a four-dimensional data set comprising unidentified vascular voxels and unidentified non-vascular voxels, the vascular voxels comprising unidentified blood vessel site voxels and unidentified bleeding site voxels, each of the voxels representing a three-dimensional location of a time-varying signal; identifying the vascular voxels in the data set by comparing each time-varying signal of each voxel in the data set to a variance threshold; generating arterial and venous time concentration curve signals from a subset of the vascular voxels in the data set; identifying, within the vascular voxels in the data set, the blood vessel site voxels by comparing each time-varying signal of the vascular voxels to the identified arterial and venous time concentration curve signals; generating clusters of voxels in the data set by connecting spatially and temporally adjacent vascular voxels; separating the clusters of voxels into a subset of blood vessel site clusters corresponding to the identified blood vessel site voxels and a subset of remaining clusters; identifying, within the subset of remaining clusters, one or more clusters that are spatially growing over time to determine one or more active bleed sites in the patient; and generating an alert if one or more active bleed sites are determined.

In yet another aspect, the present disclosure provides a system for identifying bleeding in a patient, the system comprising: a processor in communication with an imaging modality, the processor configured to: receive from the imaging modality a four-dimensional data set comprising unidentified vascular voxels and unidentified non-vascular voxels, the vascular voxels comprising unidentified blood vessel site voxels and unidentified bleeding site voxels, each of the voxels representing a three-dimensional location of a time-varying signal; identify the vascular voxels in the data set by comparing each time-varying signal of each voxel in the data set to a variance threshold; generate arterial and venous time concentration curve signals from a subset of the vascular voxels in the data set; identify, within the vascular voxels in the data set, the blood vessel site voxels by comparing each time-varying signal of the vascular voxels to the identified arterial and venous time concentration curve signals; generate clusters of voxels in the data set by connecting spatially and temporally adjacent vascular voxels; separate the clusters of voxels into a subset of blood vessel site clusters corresponding to the identified blood vessel site voxels and a subset of remaining clusters; identify, within the subset of remaining clusters, one or more clusters that are spatially growing over time to determine one or more active bleed sites in the patient; and generate an alert if one or more active bleed sites are determined.

In a further embodiment, the processor is further configured to generate a mask to separate voxels corresponding to a region of interest from remaining voxels in the four-dimensional data set.

In a further embodiment, generating the mask comprises applying a threshold to the four-dimensional data set.

In a further embodiment, the processor is further configured to erode and dilate the mask to further sever the voxels corresponding to the region of interest from the remaining voxels.

In a further embodiment, identifying the vascular voxels in the data set further comprises generating variance data from the time-varying signal of each voxel, the variance data of the data set containing a low-frequency background shift.

In a further embodiment, the processor is further configured to correct the variance data of the data set using a median filter to remove the low-frequency background shift.

In a further embodiment, the processor is further configured to: determine an observed cumulative distribution function (CDF) of the variance data set; model a known probability distribution to a lower segment of the observed CDF to generate an estimate of a threshold CDF; and determine the variance threshold to correspond to a probability nearly equal to 1 on the first estimate of the threshold CDF.

In a further embodiment, the known probability distribution is a normal distribution, a chi-square distribution, or a non-central chi-square distribution.

In a further embodiment, the lower segment of the observed CDF corresponds to a segment of the CDF having probability <0.5.

In a further embodiment, the probability nearly equal to 1 is a probability in the range of 0.99 to 0.995.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for automatically identifying active and on-going bleeding in a patient from image data. The patient may be, for example, a human patient. Alternatively, in some embodiments, the patient could be a non-human animal at, for example, a veterinary facility. The method and system may not depend on an underlying mathematical model of the bleed process to identify the bleeding. In various embodiments, the bleeding is identified by the spatial expansion of a three-dimensional image contrast signal over the time of measurement. The identification of the bleed relies on the combination of the temporal and spatial profile of the data relating to the bleed; therefore, the identification of the bleed may not need to depend on the absolute intensity or pre-specified morphology of the contrast signal distribution.

When patients present at a hospital with a suspected injury that may include internal hemorrhaging, there is often a very limited window of time for diagnosing and treating the patient in order to avoid serious injury or even death. Consider for example the case where a patient is rushed to the hospital with a suspected stroke or brain injury. Such a patient would generally undergo a computerized tomographic ("CT") scan. Over 60,000 of these patients per year in the United States are found to have a "bleeding stroke" on that CT scan. These bleeding strokes are the most severe form of stroke: 40% of patients will die, and 80% of survivors will be disabled.

Roughly one-third of patients with bleeding strokes are still bleeding at the time of the CT scanning. These patients are the ones at highest risk of death and disability. Bleed rates as little as 1 mL per minute can dramatically reduce the chance of survival and must be treated immediately. Unfortunately, techniques to detect ongoing bleeding are currently restricted to hospitals with advanced stroke expertise and require immediate processing and interpretation by experienced stroke physicians and radiologists.

For the vast majority of hospitals, there is no way to determine whether a patient is bleeding into their brain when the patient is first admitted to the hospital. Accordingly, some embodiments disclosed herein relate to an automated system that may be used to identify internal bleeding.

Figure 1:
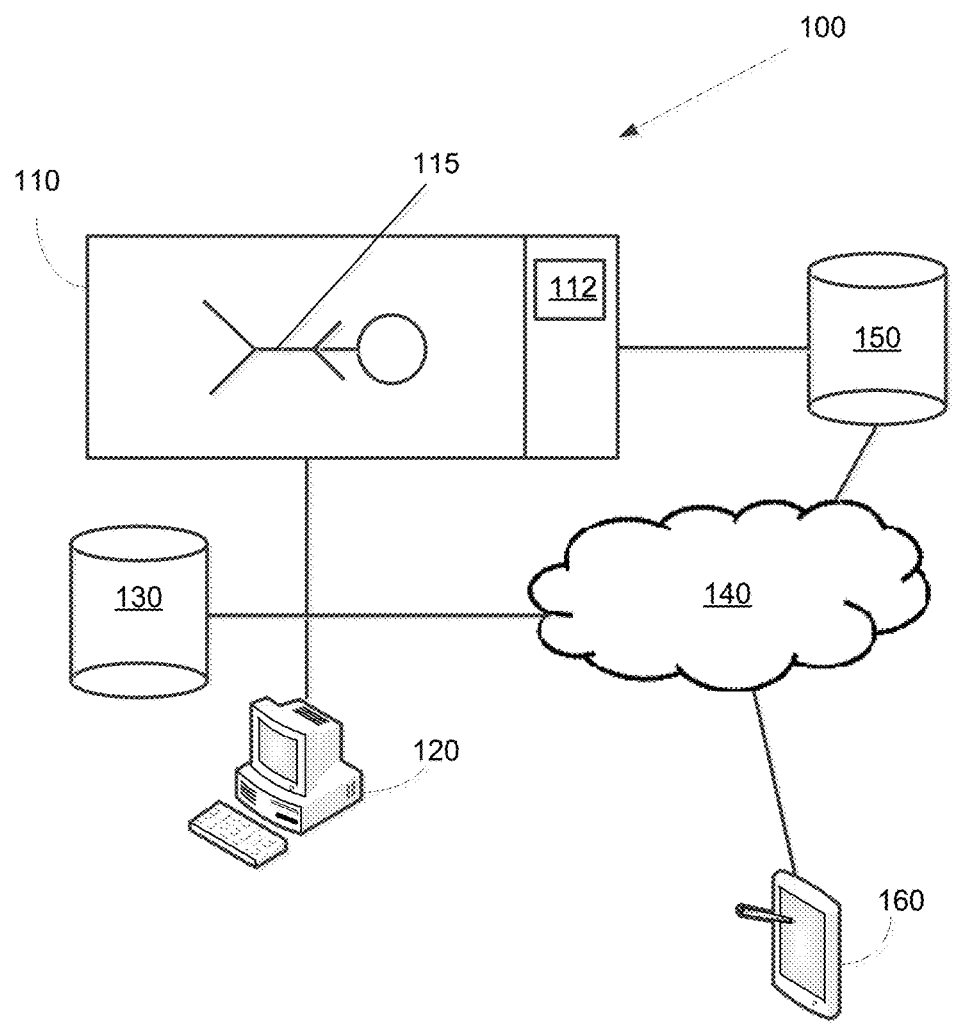
FIG. 1 is a block diagram illustrating a system according to an embodiment of the present disclosure.

FIG. 1 illustrates a block diagram of a system in accordance with various embodiments disclosed herein. System 100 includes a modality 110, such as for example but not limited to a CT scanner or a MRI (Magnetic Resonance Imaging) scanner. Modality 110 is used to scan a patient 115. The scan of patent 115 can be, for example, of the entire body or of specific portions of the body such as, for example, the head or abdomen. Modality 110 includes one or more processors 112 as well as other hardware for carrying out the scan and generating medical images, which may be viewed on workstation 120 and stored on storage device 130. Storage device 130 may, for example, be an internal component of modality 110 or workstation 120. In some embodiments described herein, processor 112 is configured to identify internal bleeding of a patient. In some embodiments, processors of workstation 120 or computing device 160 can also be configured. The process by which this determination is made will be described in greater detail below.

The scan may be carried out by radiologic technologists or other medical professional who operates modality 110. Generally, as the scan is being carried out, the technologists or other medical professional may be in a separate control room monitoring the scan on workstation 120, which includes a display and input devices.

The modality 110, workstation 120, and storage device 130 may also be coupled to network 140 for transmitting and archiving images on data storage 150. Remote computing device 160 can also be used to view the images 160 through network 140. In various embodiments, computing device 160 can include but is not limited to a desktop computer, laptop computer, tablet computer or any mobile computing device.

In various embodiments, system 100 is configured to determine whether patient 115 is actively bleeding internally and to display information reflective of that determination on for example the display of workstation 120 or computing device 160. In various embodiments, system 100 is also configured to display information regarding the bleed, which may include, but is not limited to, one or more of the location of the bleed and the rate of bleeding.

Figure 2:
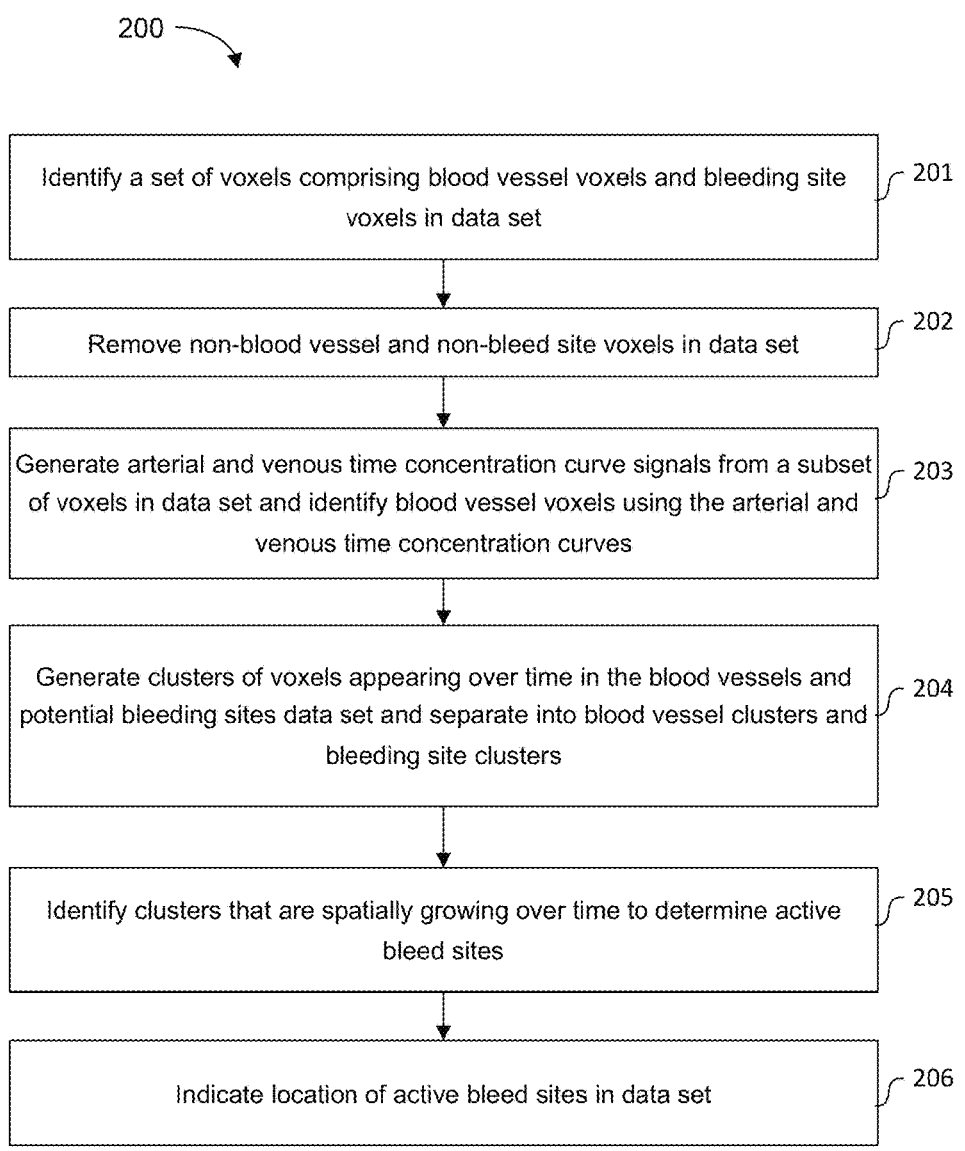
FIG. 2 is a flowchart diagram illustrating a method of identifying bleeding according to an embodiment of the present disclosure.

FIG. 2 shows a flowchart illustrating an example of a method 200 of identifying bleeding according to an embodiment of the present disclosure. The method may be carried out by software executed by, for example, processor 112 of modality 110 or a processor of workstation 120 or computing device 160. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

A bleed into tissue represents an accumulation of liquid within that tissue, which does not disappear over the time of measurement. By injecting a contrast agent into the circulation of a patient, the appearance, accumulation and dispersion of the contrast extravasated from blood vessels into tissue can be detected and measured. Any imaging modality capable of visualizing a contrast generated signal in space, and performing repeated measurement could provide the information for method 100. In an embodiment, the method operates on data from CT imaging, where iodinated contrast agent is administered intravenously and rapid accumulation of contrast within the tissue region of interest is automatically detected and measured.

Current generation CT-scanners create a four-dimensional data set, which comprises a time series of three-dimensional digital images from the tissue of interest. In an embodiment, 19 images of the brain are obtained over approximately 1 minute. It would be known to persons skilled in the art that other imaging sampling rates and other imagining durations will also be compatible with the teachings of the present disclosure.

The four-dimensional data set includes voxels that are initially unidentified. That is, the modality 110 has not categorized the voxels as relating to vascular structure and sites of active bleeding.

At 201, the processor identifies the set of image voxels containing contrast signals arising from vascular structures (e.g., blood vessels and related structures), sites of active bleeding, and any remaining voxels with high signal variability in the data set. Subsequent steps will identify and separate the bleeding site voxels from the blood vessel and other voxels.

In an embodiment, the identification at 201 comprises organizing the 4D data set into a plurality of time-varying contrast signals. Each time-varying contrast signal represents a contrast level of an individual voxel over the time span of the 4D data set. The embodiment further comprises comparing the variance of each contrast signal over time to a pre-specified variance threshold. Upon injection of the contrast agent, all regions with high contrast content will show high contrast signal variance; thus, this comparison will allow for identification of voxels representing vascular structures, regions of contrast extravasation (bleeding sites) and regions with significant transport of contrast from the vascular space. Regions below this variance threshold represent non-vascular tissue structures and non-bleeding sites.

In another embodiment, the identification at 201 optionally comprises an adaptive variance threshold for identifying voxels with high variance signals (vascular structures, bleeding sites, and other causes for signal variability). In this embodiment, the adaptive variance threshold is determined from the observed data.

At 202, the processor removes any remaining voxels with contrast signals unlikely to represent vascular or contrast leakage sites from the selected set of voxels with high signal variance. Each contrast signal exceeding the variance threshold is searched for characteristics consistent with contrast in vascular and related structures. For example, the search may comprise identifying: 1) a pre-contrast baseline; 2) the times for the start and maximum of the contrast signal; 3) the average contrast level at the final observation times. Contrast signals with average final value less than the pre-contrast baseline value or temporal profiles unlikely to represent contrast signal may be excluded (for example signals showing a high correlation to a continuous linear change or other unexpected signal shape). Furthermore, voxels with density values and/or signal variance outside expected limits (which may be pre-specified or determined by the observed distribution of values in the data set) are removed. Removal 202 may also optionally comprise removal of small 3D objects in the remaining data.

At 203, the processor identifies high signal variance voxels that represent arterial and venous structures from the set of high signal variance voxels identified at 201 and 202. Identification is based on time signals within the high variance signal set meeting minimal signal shape requirements and requirements on arrival time of contrast signal. A 3D mask is created from the high signal variance voxels.

In an embodiment, the vascular signals will meet the following minimum signal shape requirements: the vascular signals will have a level at the final observation times greater than the pre-contrast arrival baseline and a peak value that lies between the last pre-contrast time and the final observation time.

In further embodiments, the 3D mask of candidate voxels is opened by a small radius disk (or sphere) to remove very small structures from further consideration. This amount is set slightly larger radius when searching for venous structures to enrich the data set with signals arising from veins (in one embodiment the radii are 2 and 4 voxels for the arterial and venous searches respectively). Sets of small spatially contiguous regions within this mask are obtained and the average (or other suitable statistic, such as the median) of the contrast signal over time obtained. The spatial locations within the 3D mask image of these small sampling regions can be predefined or chosen at random from the data set. In one embodiment, signal is obtained from the largest 3D connected region within a small ellipsoid volume (all three elliptic diameters of 31 voxels) centered around the sampling points however other sampling volumes and shapes can be considered.

Contrast signals meeting the minimal shape requirement will be further evaluated. Contrast signal passage is defined as a change of signal above the initial/baseline value that exceeds a specified threshold and persists for a least a specified number of time points. These signal threshold parameters may be pre-specified, modified and/or generated by the observed data signals.

For each potential vascular signal in the sample set generated at 203, the processor generates and records basic statistics, including signal value at the first and final time measurements and the peak signal value and corresponding time index. The processor calculates a signal first moment with respect to time. Signals that do not conform to a basic expected shape of a vascular time concentration curve following a bolus injection IV of contrast material are rejected. The mean and variance of the peak signal change from signal baseline and from final signal value (normalized by peak signal value) are calculated. Signals that have changes that deviate significantly from the observed mean changes can be optionally rejected. Default behavior may be, for example, to have this option off for arterial identification but to turn it on for venous identification to reduce spot sign signal contamination of the venous data curve.

The processor first identifies arterial signals. The distribution of time indices of the maximum signal intensity and signal first moments from the set of sampled regions is obtained and a fraction of the earliest time values for signal intensity and/or signal first moment are selected. The arterial time concentration curve is the average of these selected signals weighted by the number of image voxels contributing to the signal.

The processor next identifies venous signals. By default, signals with smaller signal changes between start and end values relative to the peak value are removed to exclude contamination from any spot sign signal which can bear some resemblance to the venous curve but typically show small relative change. The distribution of peak signal index times is determined and a fraction of curves with the latest time points selected. In the current embodiment, a fraction of these signals with smallest first moments are selected (again to avoid contamination by spot sign or structures with high blood brain barrier permeability to contrast). A candidate venous concentration curve is calculated as a weighted average of selected sample curves. Even in the setting of active contrast extravasation, the vast majority of contrast is restricted to the vascular compartment on a single pass through tissue and the venous curve shape should resemble the arterial curve. This is evaluated through cross correlation and a venous curve is confirmed if the maximum cross correlation with the arterial curve exceeds a specified threshold (in the current embodiments this is 0.75). If not the above process is repeated with the selection window moved fractionally forward in time until a venous curve is found.

Once arterial and venous curves are identified these curves may be optionally explored to ensure they are of sufficient quality to proceed.

At 204, the processor generates clusters of voxels within the 4D data set that are contiguous in space (3D) and time (the fourth dimension). The 4D dataset is organized as a plurality of time-varying contrast signals, such that each signal represents a time-varying contrast level for each individual voxel in the 3D volume that was imaged. Each time-varying contrast signal can be associated with a time of signal onset. The time at which the contrast level in the contrast signal is detected to change generally from "low" to "high" is considered the time of signal onset. According to an embodiment, once a time of signal onset is identified in a contrast signal at a specified voxel, signal is identified to be present, or "high", at that time point and at all later time index values and to be absent, or "low", at all earlier time points. In this manner 4D clusters of "high" signal are created. The spatial extent of the clusters and signal statistics (such as mean, median) in each cluster are calculated over time. By requiring a signal to be set to "high" at all subsequent time points once it is identified at a specific voxel, clusters of connected voxels with "high" signal can only remain the same or increase in spatial extent at each subsequent time point. The signal statistics can be calculated relative to the number of voxels set at a specific time or the total number of voxels set at the last time point. Optional removal of clusters with very small average size is performed (defaults to less than 4 voxels in the current embodiment).

The 4D clusters can be identified using connectivity evaluation in 4D. However, the requirement that a voxel once identified to be "high", remains "high" at all subsequent time points allows the problem to be collapsed to a connectivity determination in 3D, which is the method used in the current embodiment. A 3D image is created with the onset time of each voxel signal in the set of voxels selected at 201 and 202 recorded in the image. All other voxels are set to zero and the connectivity of the non-zero voxels evaluated in 3D. These clusters along with the voxels values indicating signal start time hold the equivalent information as the 4D clusters generated using connectivity in 4D.

At 205, the processor separates the identified clusters at 204 into vascular regions, regions showing no growth over time, indeterminate growth regions and regions showing growth over time. The latter will be interpreted as sites of contrast leakage.

To identify vascular regions the average signal within each cluster is first cross-correlated with either the arterial or venous signal identified at 203. Clusters are identified as vascular if the maximum correlation coefficient approaches 1 (>0.98 in one embodiment). If this is not the case then the best fit (in the least squares sense) linear combination of the arterial and venous signals is cross-correlated with the cluster signal and the region designated vascular if a high maximum correlation coefficient found (0.94 in one embodiment). Other options include a best-fit linear combination including a modeled offset and to perform fitting with the restriction that modeled signal coefficients remain 0.

The remaining non-classified clusters at 205 are evaluated to identify clusters exhibiting spatial growth (in 3D) over time. In one embodiment growth is determined by evaluating the size of the cluster at the final observation time compared to the size at a specified initial time index. Conditions on absolute and relative change may be required in addition to a requirement that growth occur during at least a specified fraction of time steps between the initial and final observation time. During growth evaluation an initial set of observation may be ignored to limit the effect of apparent growth seen in all regions at the contrast bolus first arrives. This number may be pre-specified or derived from the data (in one embodiment the rise time of the first peak in the venous signal defines the number of time steps to ignore). All regions show a small growth over time and a pooled growth fraction may be calculated. Evaluation of growth may optionally be corrected by this pooled small background growth. Clusters that do not meet growth criteria are designated as no-growth. If the number of observations in the cluster signal is less than the number of initial observations to ignore it is not possible to assess for growth and the region is labeled indeterminate.

At 206, the location or locations of the active bleed sites are indicated in the data set of the patient's scan. In an embodiment, the indication is made once all of the clusters in the 4D data set have been processed.

Figure 3:
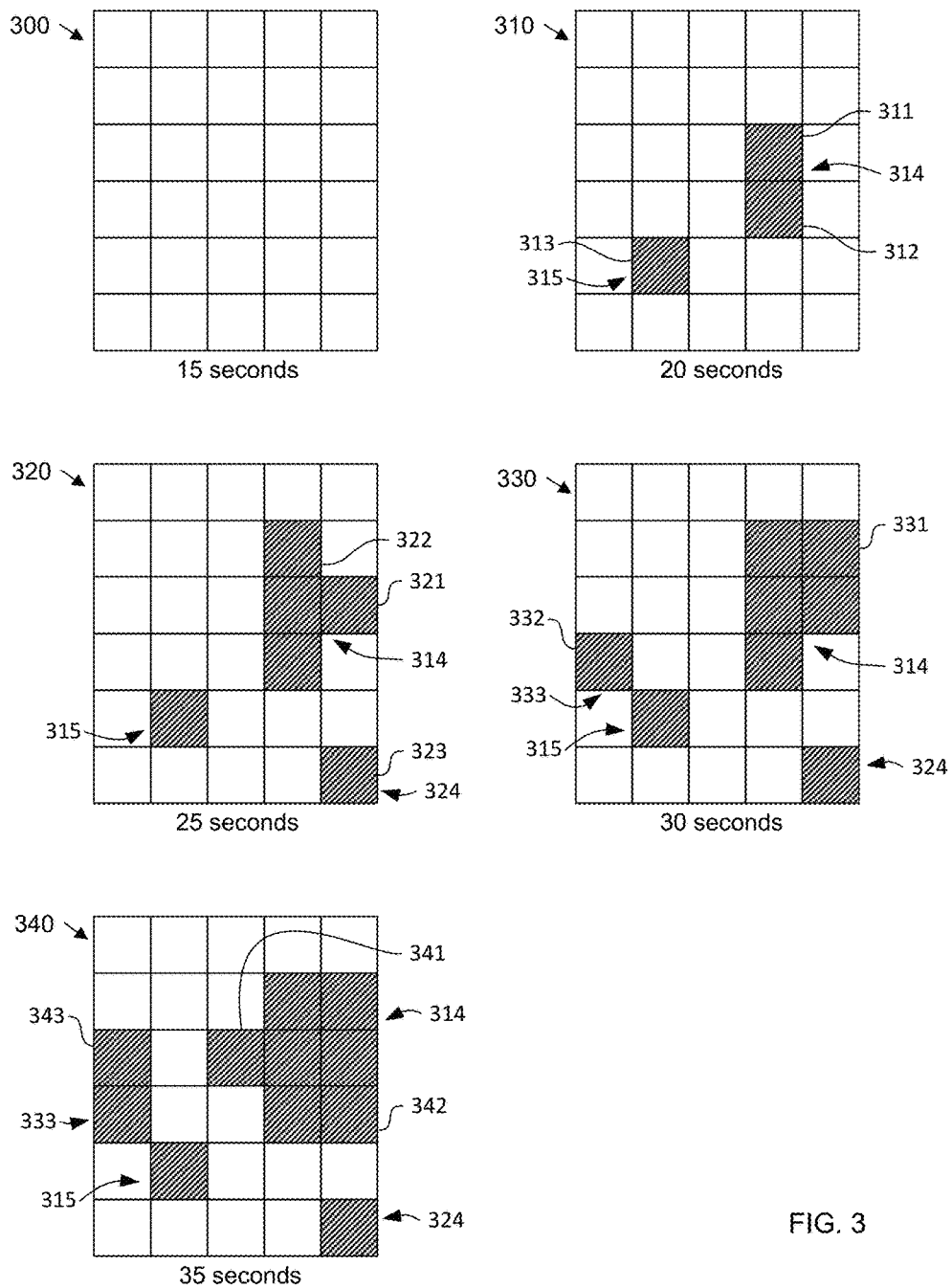
FIG. 3 is a diagram illustrating a representative two-dimensional image time-series according to an embodiment of the present disclosure.

FIG. 3 illustrates a representative diagram of a two-dimensional image time-series. While four-dimensional data sets comprising a sequence of three-dimensional image sets over time are used in the preferred embodiment, the present disclosure is applicable to any time-series data set generally, including the three-dimensional data set comprising a sequence of two-dimensional image sets over time illustrated in FIG. 3.

Therefore, it would be obvious to the skilled person that references herein to pixels are used when describing a two-dimensional image time-series (i.e., a three-dimensional data set), while references herein to voxels are used when describing a three-dimensional image time-series (i.e., a four-dimensional data set). The concepts of the present disclosure are applicable to both pixels and voxels, and these terms may be used interchangeably in the present disclosure.

A time-series according to the example of FIG. 3 comprises two-dimensional image data sets 300, 310, 320, 330, and 340, taken at 15, 20, 25, 30, and 35 seconds, respectively, after contrast agent injection. In relation to method 200, the time-series of FIG. 3 is representative of data processing at 204 and 205.

The time-series illustrates the cluster generation at 204. Image 300 shows no contrast pixels detected in the data set 15 seconds after the injection of the contrast agent; therefore, no cluster is present.

Image 310 shows the onset of contrast signal in three contrast pixels 311, 312, and 313, in two groups of spatially connected pixels, 314 and 315, 20 seconds after the injection of the contrast agent. Groups 314 and 315 each represent locations of clusters.

Image 320 shows 6 contrast pixels in three groups, 314, 315, and 324, 25 seconds after the injection of the contrast agent. The time of signal onset for three of these pixels was previously determined from image 310; thus, cluster generation at 203 has previously assigned these pixels to the clusters at 314 and 315 of image 310, which also remain in image 320. New contrast pixels 321, 322, and 323, identify the onset of signal detected at this time for these pixels. Two new contrast pixels 321 and 322 have appeared spatially contiguous with 314 and are therefore assigned to that group. Group 314 has grown to 4 pixels, which shows spatial growth of this cluster. Group 324 is a new cluster generated from the newly detected contrast pixel 323.

Image 330 shows 8 contrast pixels in 4 groups, 314, 315, 324 and 333, 30 seconds after the injection of the contrast agent. Group 314 has now grown to 5 pixels with the identification of a new adjacent pixel 331. Group 315 and 324 are clusters that were previously identified by the time of signal onset in images 310 and 320, respectively. Group 333 is a new cluster generated from a newly detected contrast pixel 332. It is separate from cluster 315 in an embodiment of the method used for CT brain imaging, which uses minimal connectivity to assign grouping of pixels; however, other levels of connectivity can be applied.

Image 340 shows 11 contrast pixels in four groups, 314, 315, 324 and 333, 35 seconds after the injection of the contrast agent. Group 314 has now grown to 7 pixels with the identification of new pixels 341 and 342. Group 333 has now grown to 2 pixels with the identification of new pixel 343. Groups 315 and 324 continue to show no growth. Assuming that the time at 35 seconds represents the end of the processing at 203, four clusters are generated, two of which have shown growth (314 and 333) and represent distinct sites of bleeding within the tissue. The Groups at 315 and 324 have not shown growth and, in this embodiment, are not considered sites of hemorrhage.

The clusters at 314 and 333 represent spatially and temporally connected pixels. In addition to generating clusters 314 and 333, the cluster generation process at 204 also identifies the time of onset of each cluster 314 (20 seconds) and 333 (30 seconds), as well as the size of each cluster 314 (7 pixels) and 333 (2 pixels). Thus, method 200 has identified two distinct bleeding sites in tissue, one of which has an earlier time of onset and is larger.

In a further embodiment of the present disclosure, a pre-processing method identifies a region of interest in a raw imaging data set. This pre-processing method may be used, for example, before step before 201 of the method 200 in order to pre-process the 4D data set.

Figure 4:
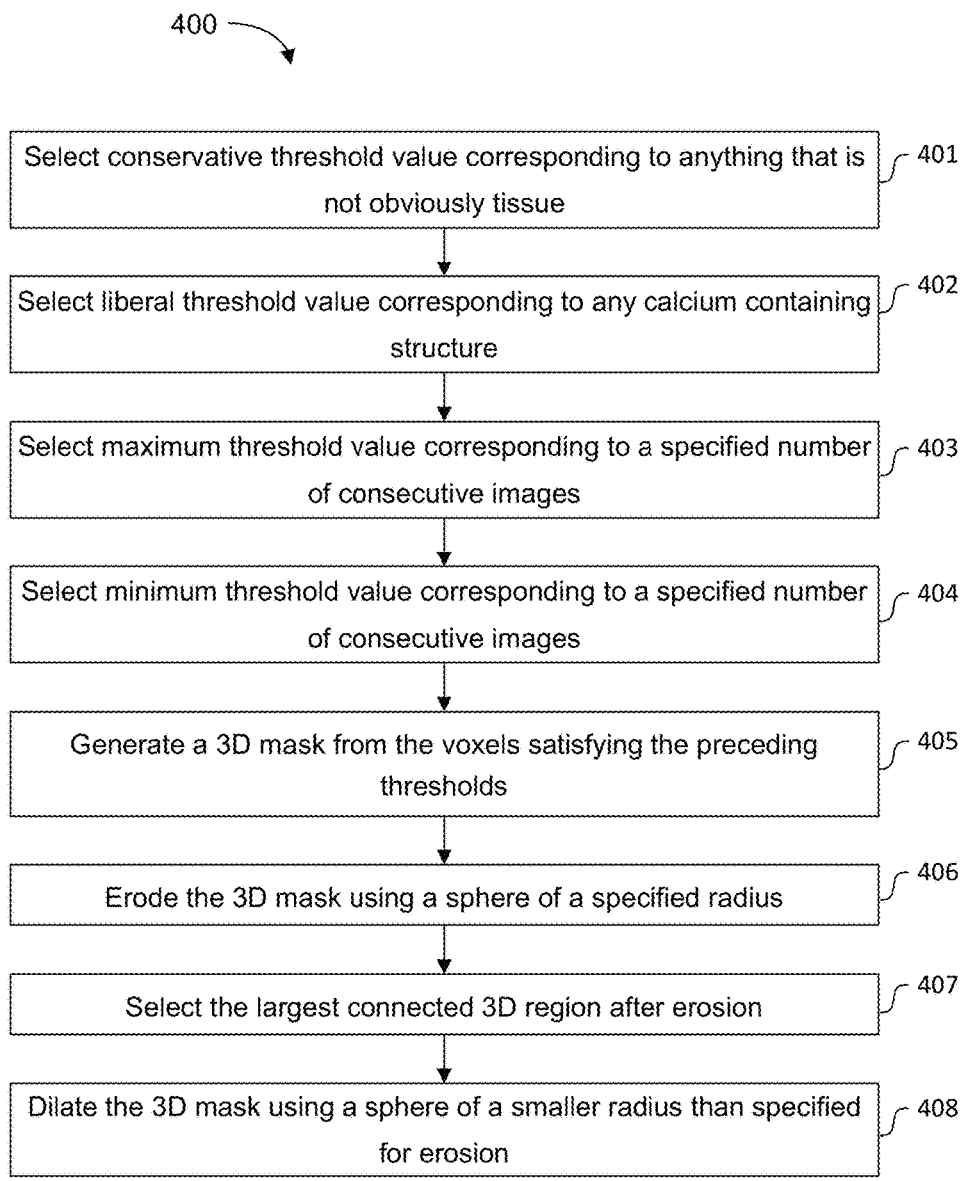
FIG. 4 is a flowchart diagram illustrating a method of masking raw imaging data to automatically restrict the imaging data to a region of interest.

FIG. 4 is a flowchart diagram of a pre-processing method 400. The method 400 comprises selecting and applying thresholds to create a mask for separating relevant tissues in the 4D data set from irrelevant tissues and structures in the 4D data set. In an embodiment, the pre-processing separates intracranial tissue from extracranial tissue and bone in the 4D data set. An example of intracranial tissue in a typical 4D data set is brain tissue and vascular structures existing within the skull; an example of extracranial or irrelevant tissue include skin, muscle, bone and eyes.

Separating the extracranial tissue and bone from the intracranial tissue allows the operation at 201 of the method of FIG. 2 to more readily identify arterial and venous contrast signals in the intracranial region of the 4D data set.

In an embodiment, the pre-processing method 400 comprises setting threshold values to define bone and air structures. Applying these threshold values to the 4D data set creates a 3D mask defining soft tissue regions only. In other words, the 3D mask removes bone and air structures from the 4D data set. The mask is created on the condition that a threshold is reached in part or in all of the 3D sub-images in the 4D set.

At step 401, the processor selects a conservative threshold value to correspond to anything that is not obviously tissue. If the intensity value of any voxel in the 4D set attains or exceeds the conservative threshold value, the spatial location associated with that voxel is rejected from the mask. The conservative threshold may also be a pair values for discriminating voxel intensities that are both above and below the pair of conservative threshold values.

At step 402, the processor selects a liberal threshold value to correspond to any calcium-containing structure. Voxel intensity values that exceed this threshold at all time points at a specified location will result in that location rejected from the mask. Thus, a contrast-related signal exceeding the liberal threshold for part of the time will not be rejected. The liberal threshold may also be a pair values for discriminating voxel intensities that are both above and below the pair of liberal threshold values.

At 403 the processor optionally selects a conditional maximum threshold. If voxel intensity values exceed this threshold for at least a specified number of time points the voxel location is rejected from the mask.

At 404 the processor optionally selects a conditional minimum threshold. If voxel intensity values are below this threshold for at least a specified number of time points the voxel location is rejected from the mask. These conditional maximum and minimum thresholds provide further selection criteria to better discriminate between tissue and vascular voxels of interest and those not of interest within the intracranial volume.

Voxels satisfying all of the selected thresholds are used by the processor to generate a 3D mask at 405. Method 400 further comprises applying image morphological operations to the 3D mask to further define the region of interest in the 4D data set. The 3D mask built from thresholds will initially include both intracranial and extracranial tissue. Therefore, erosion and dilation operations are used to separate the intracranial and extracranial tissue.

At 406, the processor erodes the 3D mask using a sphere of a specified radius. In an embodiment, the sphere may be 20 voxels in radius. Prior to erosion, the 3D mask can contain extracranial tissue structures connected to the intracranial structures through foramina (channels) in the skull or across very thin bone surfaces not rejected in the thresholding. These include, for example, the optic nerve to the eye (foramen), and sinus spaces (thin bone surface). Eroding the 3D mask using this sphere severs the connections through foramina and thin bone surfaces captured in the initial 3D mask, thus disconnecting the intracranial structures from the extracranial structures.

At 407, the processor selects the largest connected region of these separated pieces within the 3D mask as an approximation of the intracranial contents.

At 408, the processor dilates, by a smaller radius sphere, the largest connected region of the eroded 3D mask. In an embodiment, the radius is 8 voxels. Dilation of the 3D mask returns some of the intracranial volume removed by the erosion operation at step 406. In an embodiment, dilation along the axis of CT scanning can also be used to recover any image slices that were dropped from the 3D mask during the erosion. Further removal of any non-tissue boundary regions and recovery of any internal holes within the mask (which are filled at the start of the process) can be achieved combining the mask generated at 408 with the original tissue mask.

Figure 5:
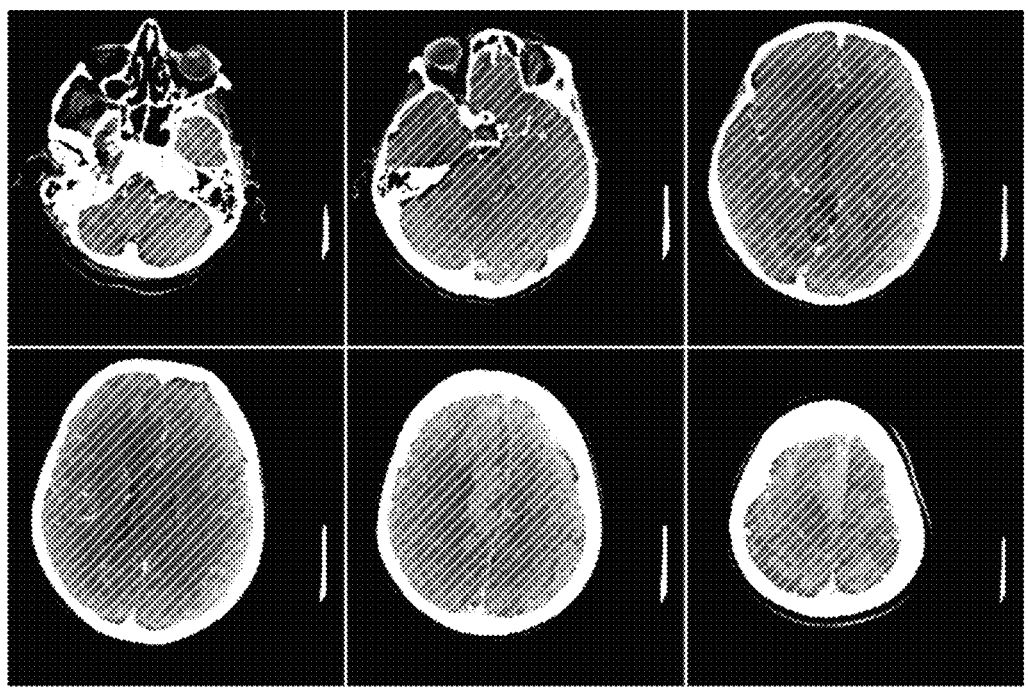
FIGS. 5 and 6 are diagrams illustrating various view of an intracranial mask generated according to the masking method of FIG. 4.

FIG. 5 shows a series of image slices normal to the axial direction of a 3D data set. The hatched central region(s) in each image represents a slice of the 3D mask.

Figure 6:
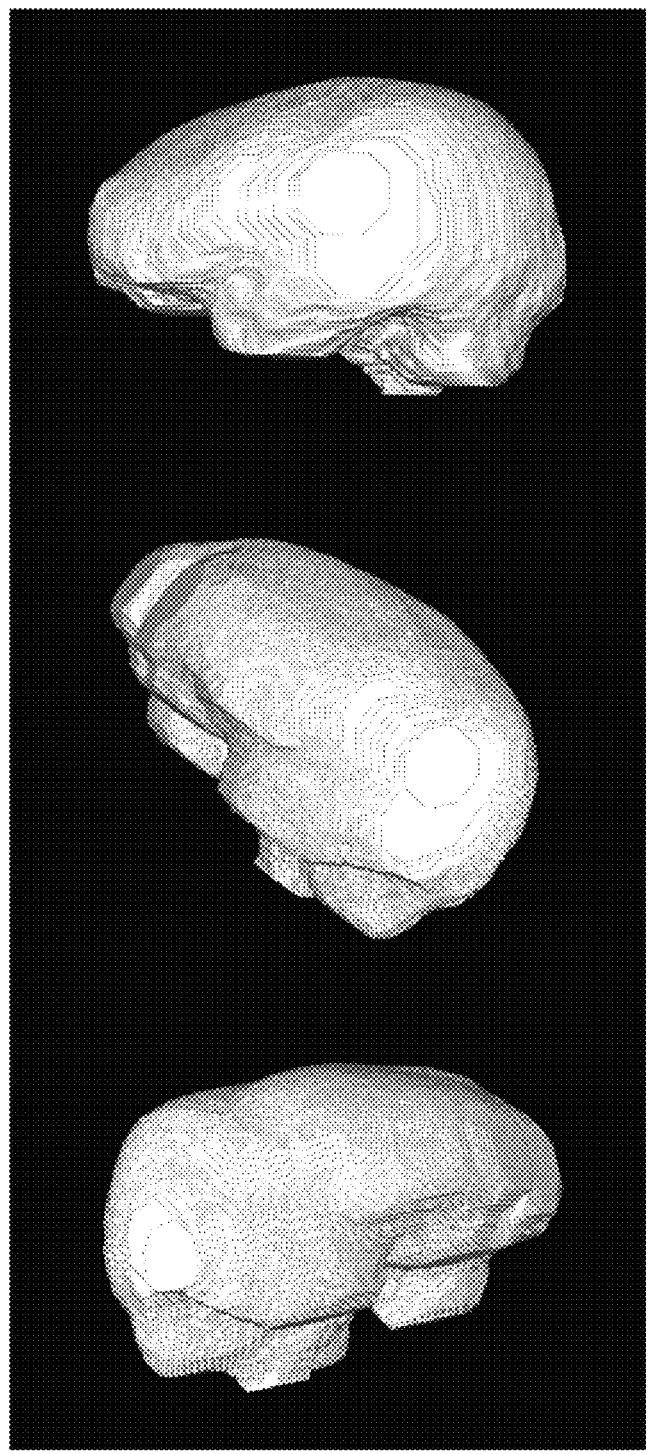

FIG. 6 shows various perspective views of a 3D mask assembled from the stacked mask slices of FIG. 5. The result of pre-processing method 400 is the 3D mask shown for example in FIG. 6, which the processor may apply to a raw 4D data set to separate physical regions of interest from regions that are not-of-interest. In the embodiment of FIGS. 5 and 6, the processor generates the 3D mask from a head imaging scan; therefore, the processor applies the 3D mask to the raw imaging data to separate intracranial matter from extracranial matter. The imaging data relating to the intracranial matter is therefore ready for the operations of method 200.

Referring back to method 200 of FIG. 2, step 201 identifies a set of voxels with high signal variance including blood vessels and bleeding site voxels in the data set of the region of interest. As discussed above, the processor compares a plurality of time-varying contrast signals to a variance threshold value in order to identify and separate these voxels from non-blood vessel and non-bleeding site tissue voxels.

A first embodiment of the present disclosure uses a pre-specified variance threshold value, which may be selected according to the particular imaging machine and the region of interest being imaged.

A further embodiment of the present disclosure uses an adaptive variance threshold value that is dynamically determined from the observed data. The adaptive variance threshold value allows the method 200 to have greater compatibility with different imaging machines and technologies, as well as with different regions of interest.

Figure 7:
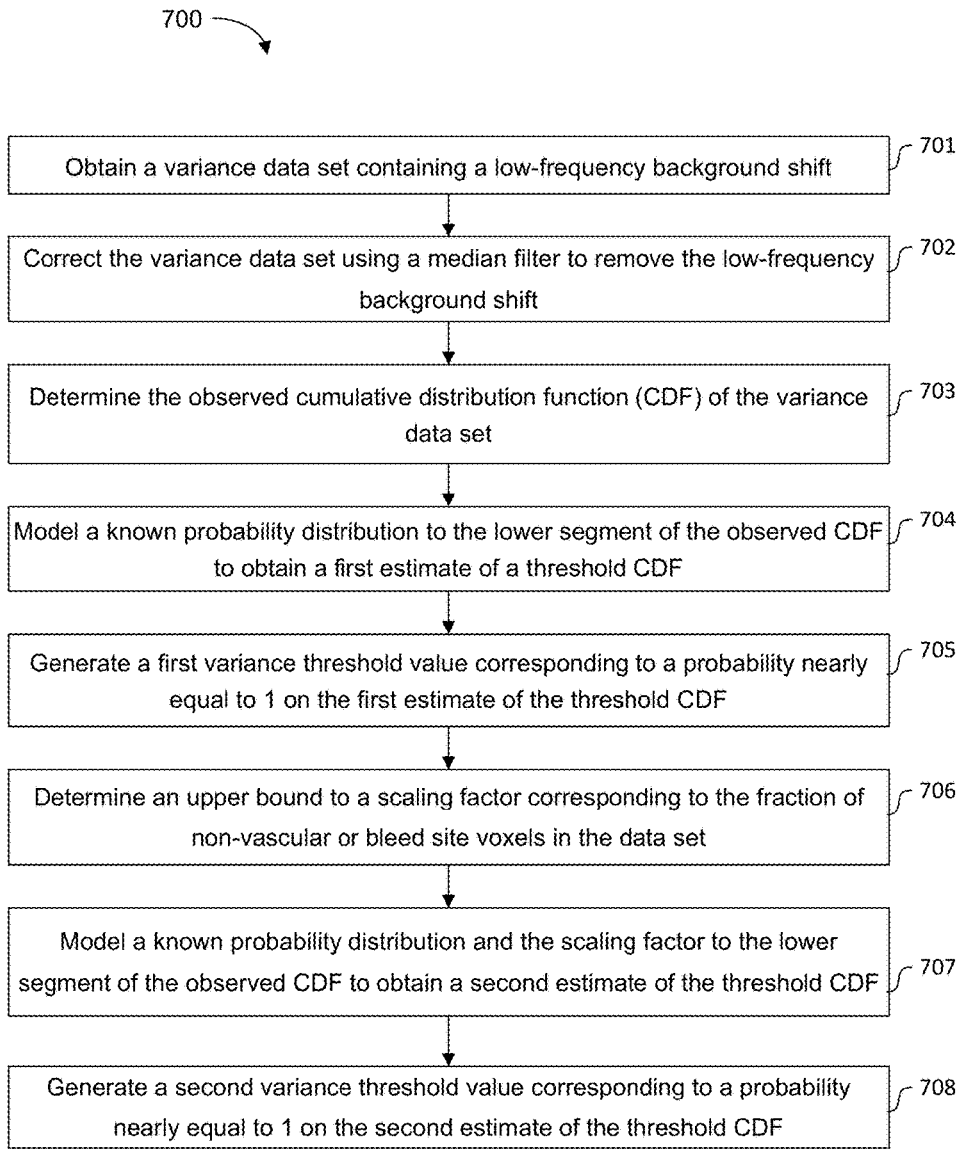
FIG. 7 is a flowchart diagram illustrating a method of automatically setting a variance threshold according to an adaptive variance threshold for optional use in the method of FIG. 2.

FIG. 7 is a flowchart diagram of a method for determining an adaptive variance threshold value. The method 700 may optionally be used to generate the adaptive variance threshold value for use in step 201 of method 200.

Certain regions, such as the intracranial region, exhibit a low frequency spatial structure in signal variance values resulting in regional shifts of these values. These shifts may be of sufficient magnitude to require changes to any variance threshold at the different image locations in order to identify and separate blood vessel and bleeding site voxels from non-blood vessel and non-bleeding site voxels, at step 201. At 701, the processor receives a variance data set containing the low-frequency background shift.

Next, at step 702, the processor identifies and corrects the shape of the background shift in variance values using median filtering of the 3D images of voxel signal variance. The filter size is chosen to be large enough to minimize any filtering of voxel to voxel variance changes, thus maintaining information about the distribution of voxel signal variances arising from physiology and anatomy. The filter size is also chosen to be small enough to identify the low spatial frequency shift in voxel variance values that appears to be generated by the machine-dependent scanning process. Once this structure is identified it is used to correct the variance images such that all tissue voxel variance measurements arise from distributions with similar expectations for the variance values.

In an embodiment, the processor corrects the low-frequency background shift using Equation 1.

$$\text{final data} = \text{source data} - (\text{filtered data} - mv) \qquad \text{Equation 1}$$

In Equation 1, the final data is the corrected variance data, the source data is the initial variance data exhibiting the low-frequency background shift, and the filtered data is the median filtered data used for the correction.

The value $mv$ is a constant calculated from the median of the median filtered data or calculated from the mean of the median filtered data. This constant value is added back into the corrected variance data to preserve the median or mean value of the final variance data set.

The optimal size of the median filter is guided by the spatial distribution of the physiologic and anatomical structures under evaluation and by observations using phantom data. In an embodiment, the median filter dimensions ranges from $21 \times 21 \times 1$ voxels to $25 \times 25 \times 1$ voxels, where the first two values are the dimensions of the filter (in voxels) in the axial image plane and the third value is the dimension of the filter (in voxels) along the axial direction.

Figure 8:
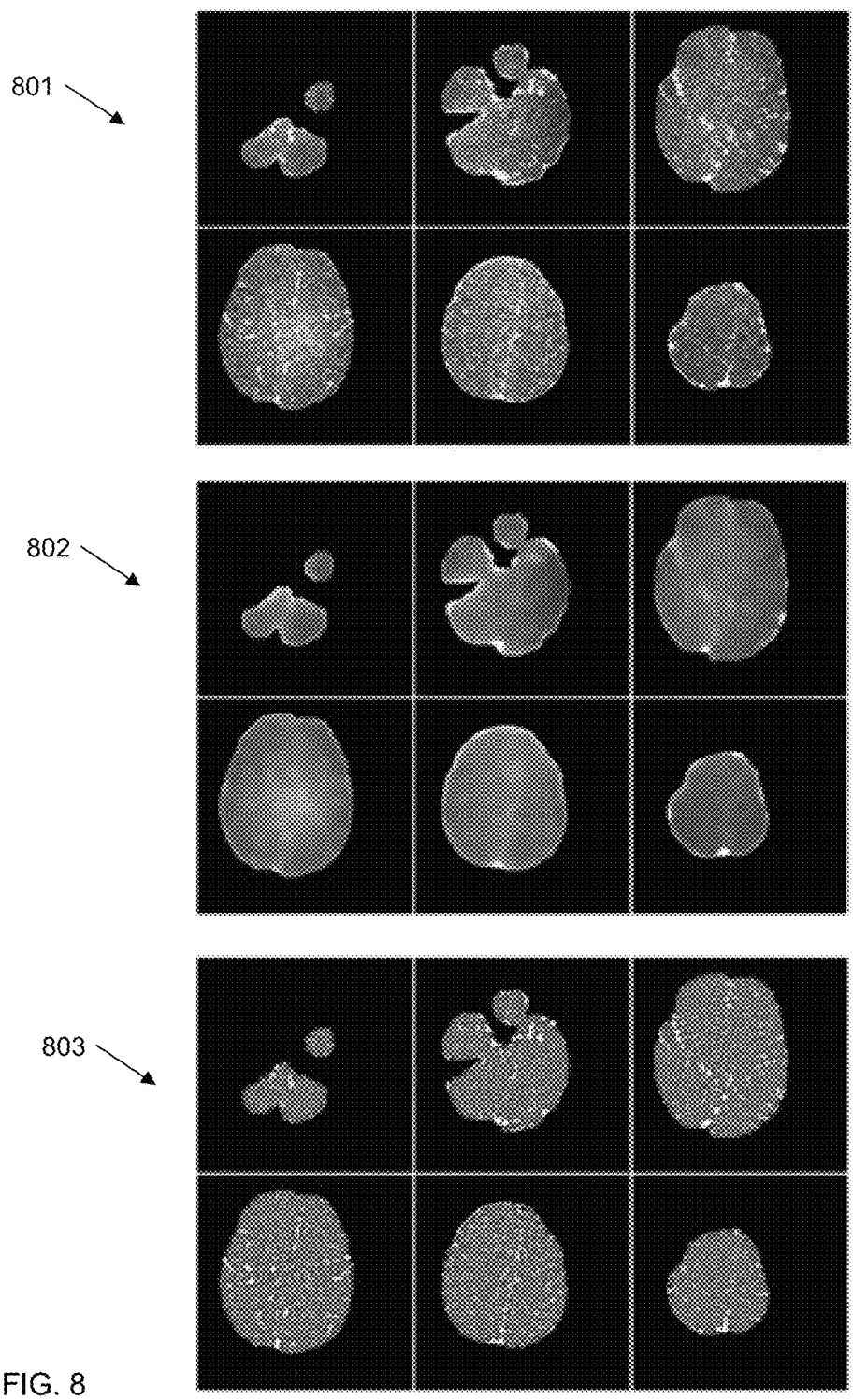
FIG. 8 is a diagram illustrating correction of a low-frequency background shift in variance data.

FIG. 8 shows a six-panel data set illustrating the correction in step 702. Variance data set 801 is the initial variance data set exhibiting a low-frequency background shift. 802 is the median filtered data set that the processor uses for correction in step 702. Subtracting the median filtered data set 802 from the initial variance data set 801 results in the corrected variance data set 803, which shows a more flat and even background variance.

Returning to the method 700 of FIG. 7, the processor next uses the corrected variance data to dynamically determine the adaptive variance threshold based on the observed distribution of values in the corrected variance data.

At 703, the processor calculates the observed cumulative distribution function (CDF) of the corrected variance values based on a histogram of the corrected variance values. In an embodiment, the number of histogram bins is pre-specified, while the processor automatically determines the histogram bin size(s) and locations to best sample the region of the corrected variance distribution required by the method 700.

The histogram of the corrected variance values can be modelled by a known probability density function (PDF) and the PDF has a corresponding CDF.

Figure 9:
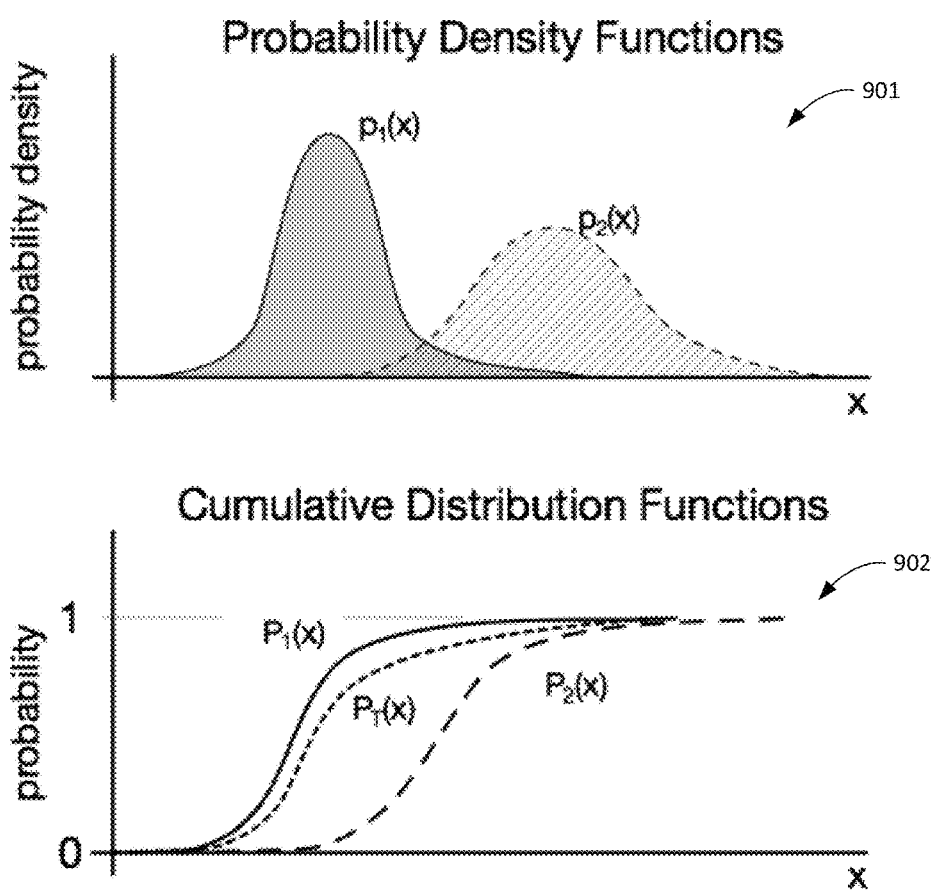
FIG. 9 are graphs illustrating model probability density functions (PDF) of non-vascular tissue (low signal variance) voxel variance values and vascular and other high signal variance voxel variance values. The model cumulative distribution functions (CDF) of these two voxel sets in relation to an observed CDF of a data variance values are also illustrated.

FIG. 9 shows a graph 901 of two PDFs presumed to model the observed variance data: $p_1(x)$, representing non-vascular voxels, and $p_2(x)$, representing vascular voxels. The corresponding CDFs, $P_1(x)$ and $P_2(x)$, are shown in graph 902 as well as $P_T$, the observed CDF, modeled as $P_T=\alpha P_1+(1-\alpha)P_2$. In this model, $\alpha$ is the fraction of voxels in the image that represent the non-vascular tissue structures. While neither $p_1(x)$ nor $p_2(x)$ are directly retrieved from the variance data, one or both of $P_1(x)$ and $P_2(x)$ can be estimated from the observed CDF, $P_T(x)$, and can be used to set the adaptive variance threshold based on a pre-specified probability threshold.

Figure 10:
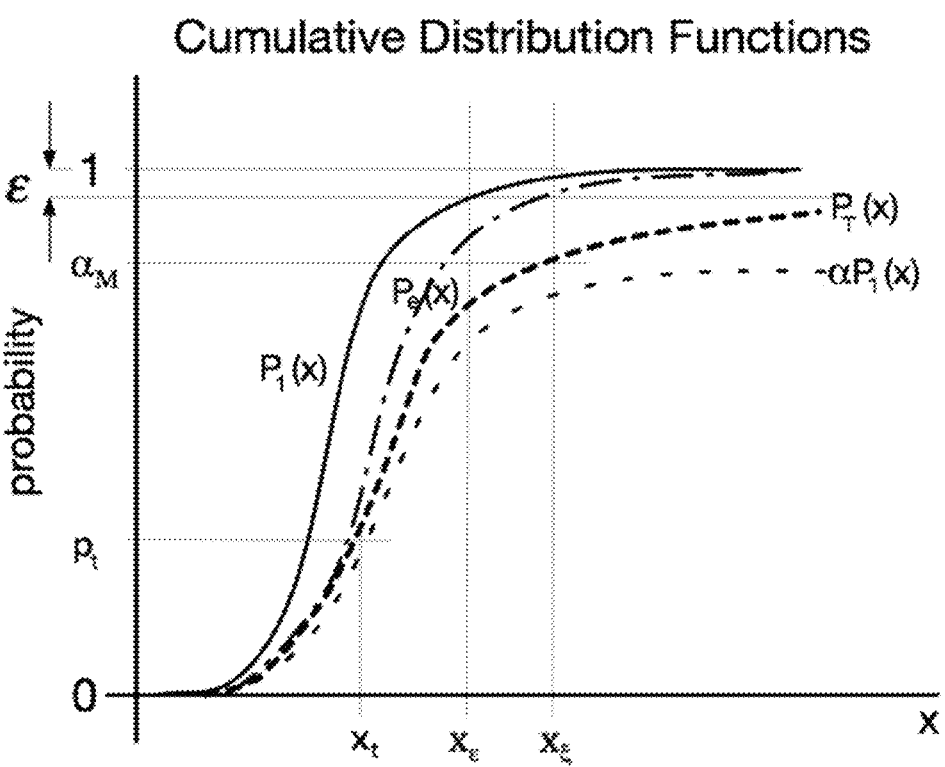
FIG. 10 is a CDF diagram illustrating estimated CDFs derived from the observed CDF and used for generating one or more adaptive variance thresholds.

Returning to FIG. 7, at step 704, the processor models a known probability distribution to the lower segment of the observed CDF $P_T(x)$ in order to obtain a first estimate of a threshold CDF. FIG. 10 shows a schematic of the first estimate of the threshold CDF being $P_e(x)$. In an embodiment, the known probability distribution is a chi-square distribution with an additional parameter to fit arbitrary variance values. In other embodiments, the known probability distribution may be a normal (Gaussian) or non-central chi-square distribution (with an additional parameter to fit arbitrary variance values). In an embodiment, the lower segment of the observed CDF $P_T(x)$, defined by the segment of the observed CDF $P_T(x)$ corresponding to probability <0.5 is used to estimate $P_e(x)$.

Returning to FIG. 7, at step 705, the processor determines a first variance threshold value corresponding to a probability nearly equal to 1 on the first estimate of the threshold CDF, $P_e(x)$. FIG. 10 shows that a small probability $\varepsilon$ less than 1 on $P_e(x)$ corresponds to the first variance threshold value, $X_\varepsilon$. The small probability $\varepsilon$ may range from 0.01 to 0.005, or even less.

In an embodiment, the method 700 ends at 705 because the first variance threshold value $X_\varepsilon$ is the value of the adaptive variance threshold, which the processor then uses in method 200.

In some embodiments, $P_e(x)$ is a suitable estimate for $P_1(x)$ and, accordingly, the first variance threshold value $X_\varepsilon$ is acceptable for use in the method 200. However, method 700 may optionally comprise additional steps 706 to 708 to calculate a closer estimate of $P_1(x)$.

Referring back to FIG. 7, at step 706, the processor determines an upper bound $\alpha_M$ for the fractional value $\alpha$. This estimate is the value $P_T(X)$ as shown in FIG. 10 and is an upper bound of the fraction of non-vascular voxels contributing with the hidden (not directly observable) variance CDF $P_1(x)$ to the total observed CDF, $P_T(x)$.

At 707, the processor models a known probability distribution (e.g. normal, chi-square, or non-central chi-square) scaled by the unknown model parameter $\alpha$ with upper bound $\alpha_M$ to the lower segment (e.g. segment with probability <0.5) of the observed CDF, $P_T(x)$ to obtain a second estimate of $P_1$ (the CDF of non-vascular voxel variance values) as well as an estimate of the fraction $\alpha$ of the non-vascular voxels.

Finally, at 708, the processor determines a second variance threshold value corresponding to a probability nearly equal to 1 (e.g., $1-\varepsilon$) on the second estimate of the non-vascular voxel CDF $P_1(x)$. In FIG. 10, this corresponds to a variance value of $X_\varepsilon$, which is the value of the adaptive variance threshold in this further embodiment.

In yet a further embodiment (not shown), the processor uses a known probability distribution to estimate the CDF of the high variance voxel set, $P_2$. Accordingly, a model of the linear combination of $P_1$ and $P_2$ ($P_T=\alpha P_1+(1-\alpha)P_2$) can be fit to the observed CDF to estimate $\alpha$, $P_1$, and $P_2$ with the requirement that the estimate of $\alpha$ falls in the interval $(0,\alpha_M]$.

The adaptive variance embodiment advantageously uses a data-driven approach to determine a suitable variance threshold to segment the vascular and active bleeding sites in the specific 4D data set under consideration. Furthermore, this adaptive variance threshold may be relatively independent of the scanner used or signal variability arising from the subject under evaluation. Therefore, the method may be portable across multiple scanning platforms.

Figure 11:
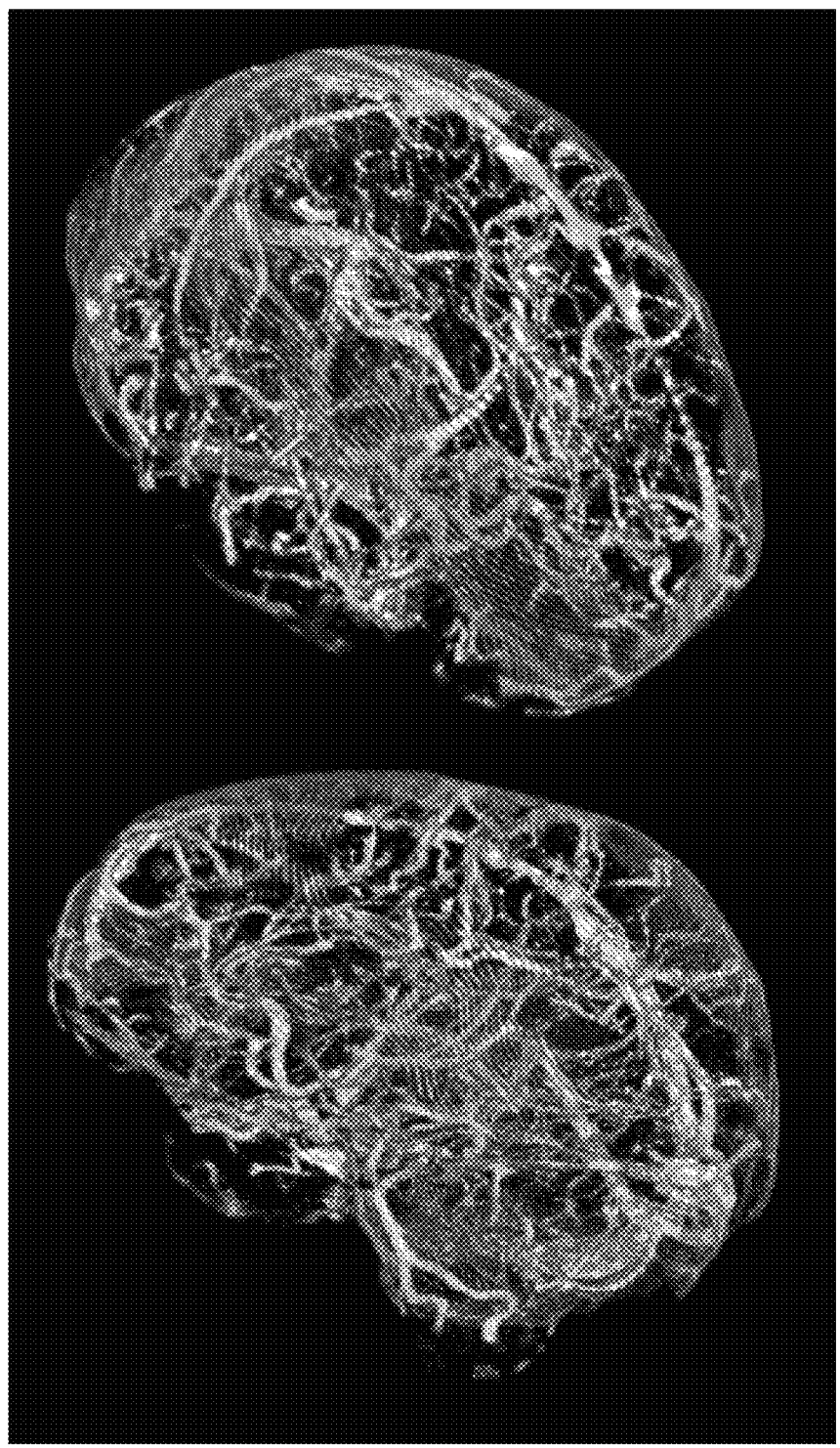
FIG. 11 is a diagram illustrating different perspective views of vascular voxels identified in the data set using an adaptive variance threshold.

FIG. 11 shows an example of vascular voxels identified in the data set using an embodiment of the adaptive variance threshold method 700. The method 200 may use the vascular voxels identified in FIG. 11 in further steps to identify bleeding sites.

Figure 12:
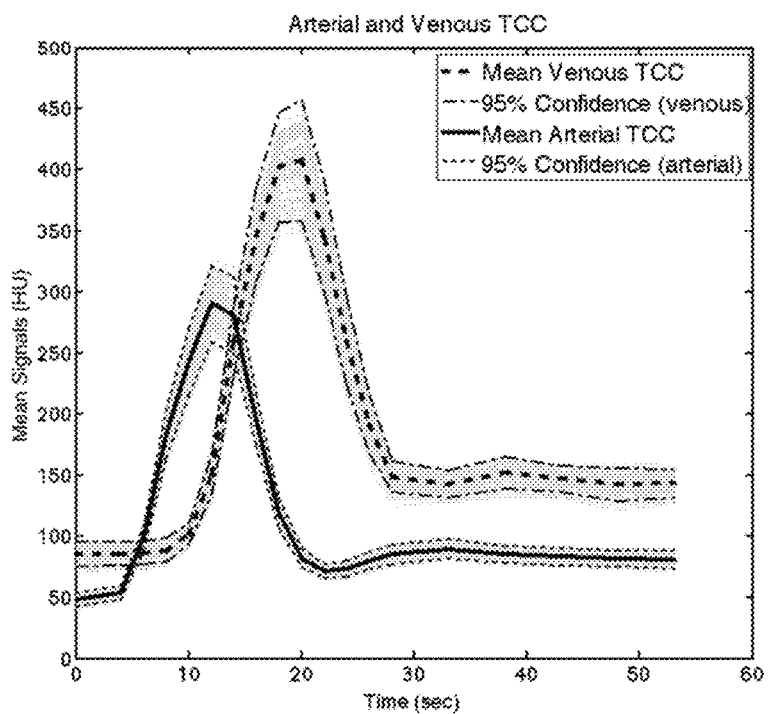
FIG. 12 is a graph showing arterial and venous time concentration curves generated from a weighted average of time-varying variance signals identified using an embodiment of the method of FIG. 7.

Referring back to method 200 of FIG. 2, the processor generates arterial and venous time concentration curves for the identified blood vessel voxels at step 203. FIG. 12 shows arterial and venous time concentration curves generated from a weighted average of the time-varying variance signals belonging to a spatially contiguous vascular voxels identified using a chi-square distribution embodiment of the adaptive variance threshold method 700 where the adaptive variance threshold was 1303.

Figure 13:
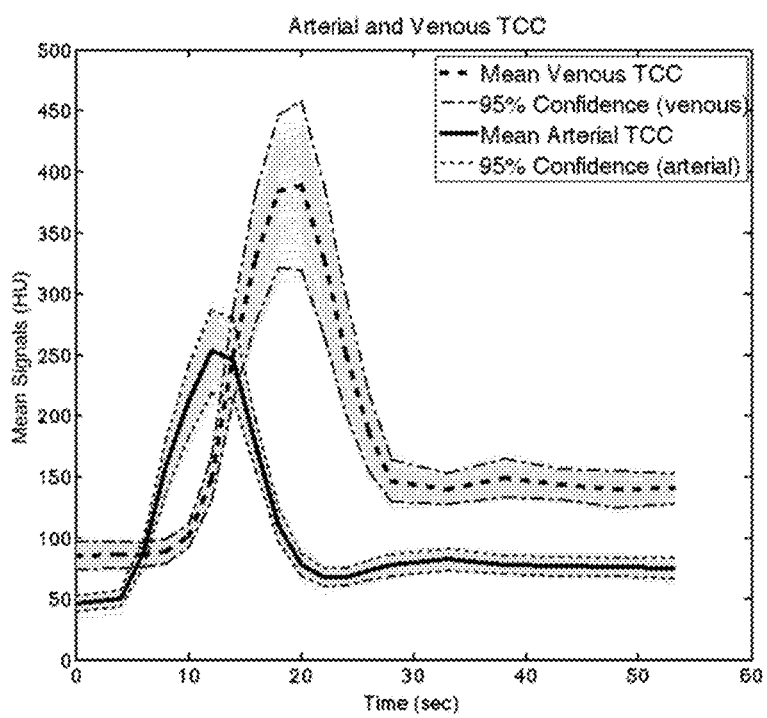
FIG. 13 is a graph showing arterial and venous time concentration curves generated from a weighted average of time-varying variance signals identified using another embodiment of the method of FIG. 7.

Similarly, FIG. 13 shows arterial and venous time concentration curves generated from a weighted average of the time-varying variance signals belonging to a spatially contiguous vascular voxels identified using a normal distribution embodiment of the adaptive variance threshold method 700 where the adaptive variance threshold was 923.

FIGS. 12 and 13 shows that the blood vessel voxels identified according to the adaptive variance threshold method 700 have well-correlated arterial and venous time concentration curves and the method 700 has a high degree of stability across a wide range of reasonable variance thresholds.

Good-quality time concentration curves allow the processor to record more accurate time of onset information and more accurately identify bleeding sites. Therefore, in a further embodiment, step 203 optionally further comprises determining whether the arterial and venous time concentration curves are of sufficient quality to proceed with method 200. In particular, the processor evaluates the signal for the presence of high-frequency noise.

An idealized vascular time concentration curve is smoothly varying during the measurement time and consists of relatively low signal frequencies. An idealized vascular time concentration signal should have most power in the lower frequency ranges and the processor uses this requirement to select or reject sample signals for further observation.

The processor uses standard Fourier analysis to calculate the distribution of signal power as a function of frequency. In an embodiment, the processor performs a power-threshold selection on arterial and venous time concentration curves by requiring good-quality signals to exhibit at least 95% of signal power below 0.25 Nyquist frequency based on the sampling interval.

Figure 14:
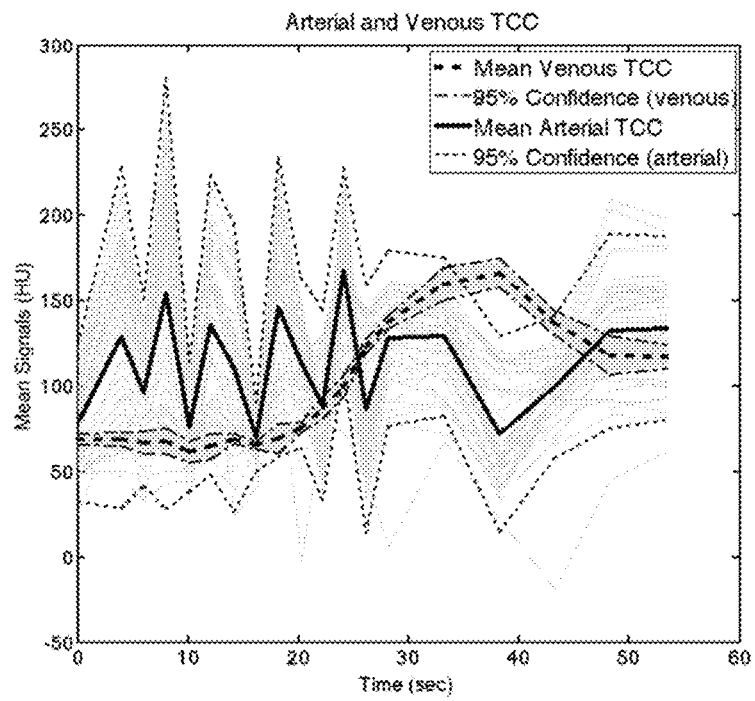
FIG. 14 is a graph showing arterial and venous time concentration curves generated without using power-threshold selection.
Figure 15:
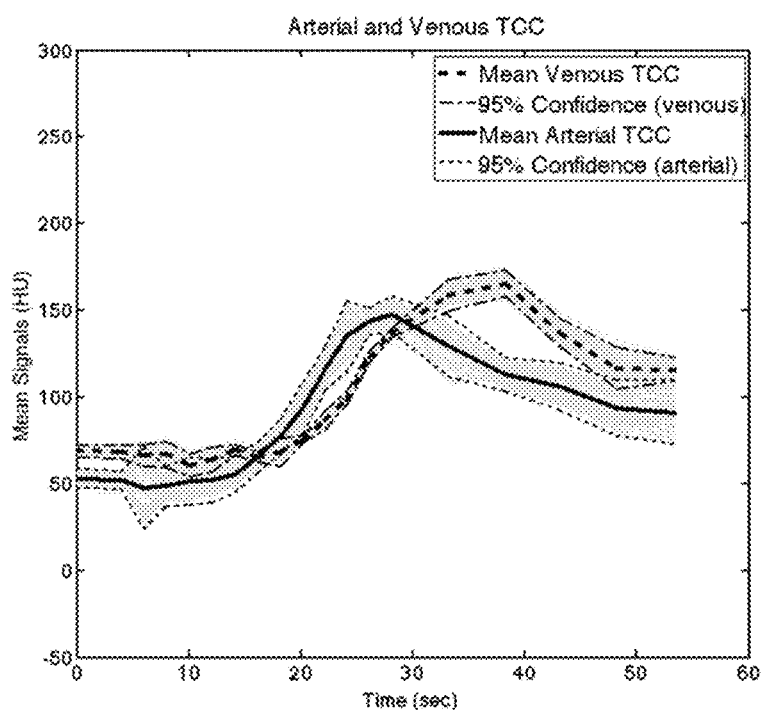
FIG. 15 is a graph showing arterial and venous time concentration curves generated using power-threshold selection.

FIGS. 14 and 15 shows a comparison between arterial and venous time concentration curve signals that were generated either without power-threshold selection and with power-threshold selection, where only 60% of the signals meet a power-threshold selection limit. In FIG. 14, when the power-threshold selection is disabled, the arterial time concentration curve is poor quality. The generated curve is high variable and does not allow the processor to identify the arterial time concentration curve. In FIG. 15, when power-threshold selection is enabled, the arterial and venous time concentration curves exhibit good-quality smooth curves.

Figure 16:
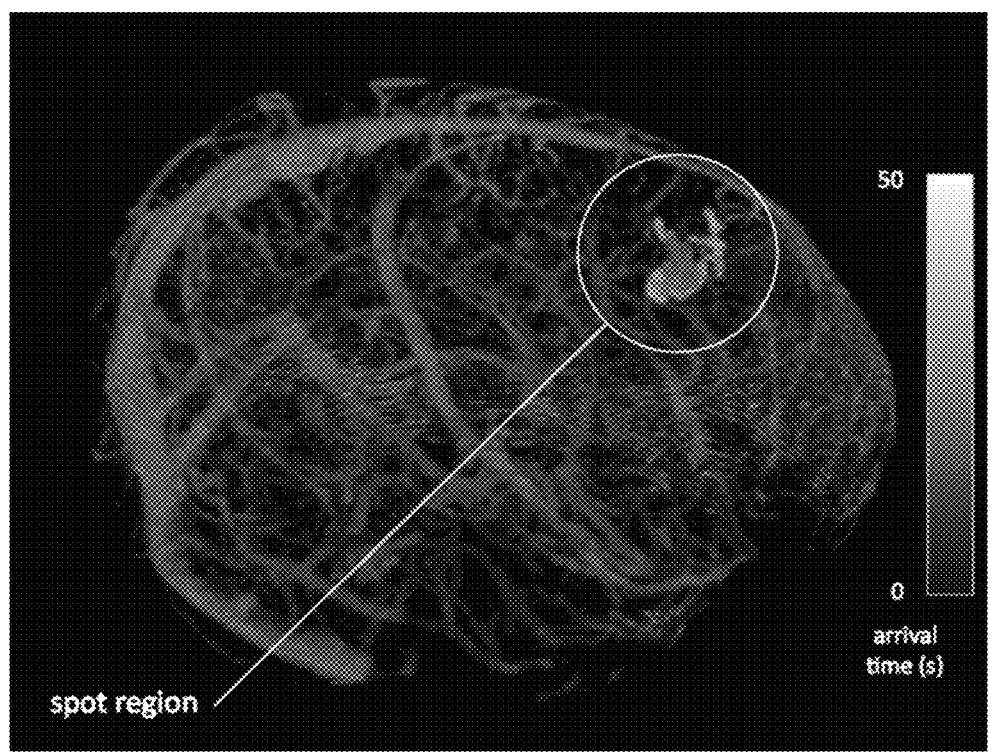
FIG. 16 a diagram showing signal arrival time in each voxel within a high variance voxel set identified according to an embodiment of the method of FIG. 7.

FIG. 16 is a 3D projection of signal arrival time in each voxel within the high variance voxel set identified according to an embodiment of the method 700. Dark grey represents early arrival times and white represents late arrival times. Arteries and veins are at medium gray levels. The confirmed spot of active bleeding in this study is shown and characterized by both early (medium gray) and late (light gray) arrival times consistent with continued spatial growth over time within this region. The spot of active bleeding was confirmed according to an operation of the method 200.

Figure 17:
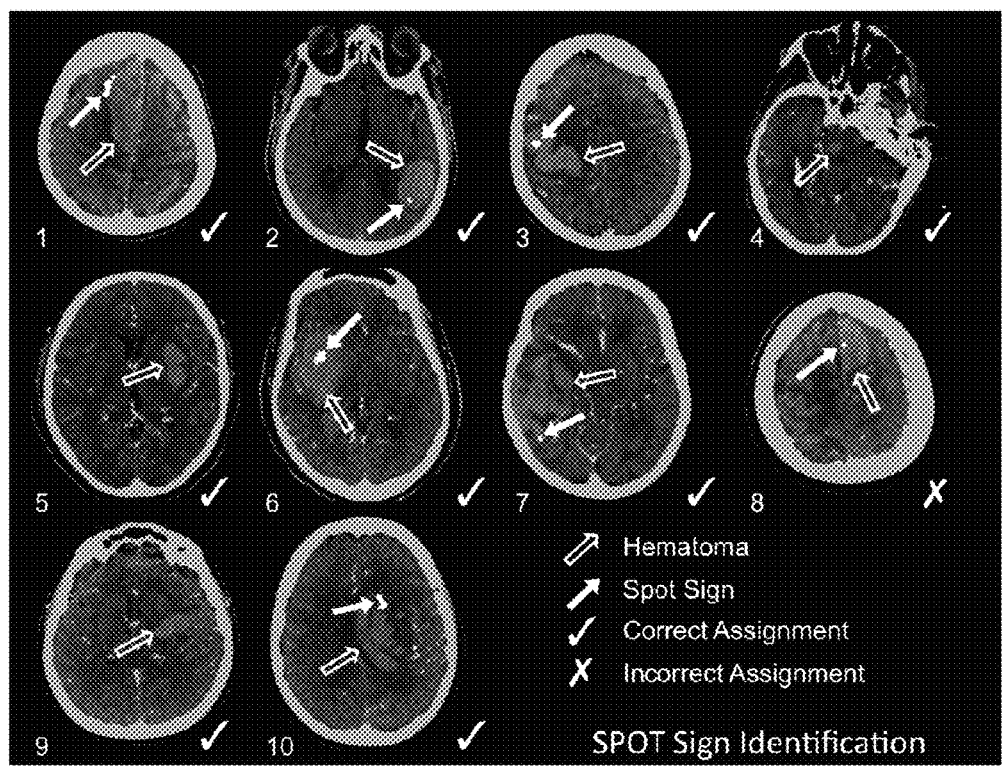
FIG. 17 is diagram showing ten examples of dynamic contrast enhanced CT studies processed by an embodiment of the method of FIG. 2.

FIG. 17 is diagram showing 10 examples of dynamic contrast enhanced CT studies processed by an embodiment of the present disclosure. In the examples, the open white arrows show the intracerebral hemorrhages that are readily visible and easily identified by trained observers using standard criteria. The spot of active bleeding in association with the hemorrhage was automatically identified by methods described in the present disclosure. The identified voxels representing the spot of on-going bleeding have been set to white in these images and are identified by the solid white arrow in the figure.

All studies were reviewed by a trained observer and a spot was considered present in studies 1, 2, 3, 6, 7, and 10. The embodiment correctly identified these spots (sensitivity 100%) but it also indicated the presence of a spot in study 8 that was not identified by the trained observer (specificity 75%).

Embodiments of the present disclosure advantageously provide a method and system for automatically identifying active and ongoing bleeding in a patient. By identifying patient bleeding without necessitating the skill and judgment of a physician, hospitals may more rapidly and effectively provide better individual treatment to patients affected with internal bleeding.

Furthermore the methods and systems of the present disclosure may be integrate with or connected to a medical imaging device so that the methods and systems of the present disclosure may immediately process the imaging data and automatically generate bleeding identification alert with minimal delay.

While specific embodiments described herein relate to identifying bleeding in the brain, it would be known to those skilled in the art that other embodiments of the present disclosure may be used to identify bleeding in the thorax or other body parts of the patient.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for identifying bleeding in a patient, the method comprising:
   receiving a four-dimensional data set comprising unidentified vascular voxels and unidentified non-vascular voxels, the vascular voxels comprising unidentified blood vessel site voxels and unidentified bleeding site voxels, each of the voxels representing a three-dimensional location of a time-varying signal;
   identifying the vascular voxels in the data set by comparing each time-varying signal of each voxel in the data set to a variance threshold;
   generating arterial and venous time concentration curve signals from a subset of the vascular voxels in the data set;
   identifying, within the vascular voxels in the data set, the blood vessel site voxels by comparing each time-varying signal of the vascular voxels to the identified arterial and venous time concentration curve signals;
   generating clusters of voxels in the data set by connecting spatially and temporally adjacent vascular voxels;
   separating the clusters of voxels into a subset of blood vessel site clusters corresponding to the identified blood vessel site voxels and a subset of remaining clusters;
   identifying, within the subset of remaining clusters, one or more clusters that are spatially growing over time to determine one or more active bleed sites in the patient; and
   generating an alert if one or more active bleed sites are determined.

2. The method of claim 1, further comprising generating a mask to separate voxels corresponding to a region of interest from remaining voxels in the four-dimensional data set.

3. The method of claim 2, wherein generating the mask comprises applying a threshold to the four-dimensional data set.

4. The method of claim 3, further comprising eroding and dilating the mask to further sever the voxels corresponding to the region of interest from the remaining voxels.

5. The method of claim 1, wherein identifying the vascular voxels in the data set further comprises generating variance data from the time-varying signal of each voxel, the variance data of the data set containing a low-frequency background shift.

6. The method of claim 5, further comprising correcting the variance data of the data set using a median filter to remove the low-frequency background shift.

7. The method of claim 6, further comprising:
determining an observed cumulative distribution function (CDF) of the variance data set;
modelling a known probability distribution to a lower segment of the observed CDF to generate an estimate of a threshold CDF; and
determining the variance threshold to correspond to a probability nearly equal to 1 on the estimate of the threshold CDF.

8. The method of claim 7, wherein the known probability distribution is a normal distribution, a chi-square distribution, or a non-central chi-square distribution.

9. The method of claim 7, wherein the lower segment of the observed CDF corresponds to a segment of the CDF having probability <0.5.

10. The method of claim 7, wherein the probability nearly equal to 1 is a probability in the range of 0.99 to 0.995.

11. A system for identifying bleeding in a patient, the system comprising:
a processor in communication with an imaging modality, the processor configured to:
receive from the imaging modality a four-dimensional data set comprising unidentified vascular voxels and unidentified non-vascular voxels, the vascular voxels comprising unidentified blood vessel site voxels and unidentified bleeding site voxels, each of the voxels representing a three-dimensional location of a time-varying signal;
identify the vascular voxels in the data set by comparing each time-varying signal of each voxel in the data set to a variance threshold;
generate arterial and venous time concentration curve signals from a subset of the vascular voxels in the data set;
identify, within the vascular voxels in the data set, the blood vessel site voxels by comparing each time-varying signal of the vascular voxels to the identified arterial and venous time concentration curve signals;
generate clusters of voxels in the data set by connecting spatially and temporally adjacent vascular voxels;
separate the clusters of voxels into a subset of blood vessel site clusters corresponding to the identified blood vessel site voxels and a subset of remaining clusters;
identify, within the subset of remaining clusters, one or more clusters that are spatially growing over time to determine one or more active bleed sites in the patient; and
generate an alert if one or more active bleed sites are determined.

12. The system of claim 11, wherein the processor is further configured to generate a mask to separate voxels corresponding to a region of interest from remaining voxels in the four-dimensional data set.

13. The system of claim 12, wherein generating the mask comprises applying a threshold to the four-dimensional data set.

14. The system of claim 13, wherein the processor is further configured to erode and dilate the mask to further sever the voxels corresponding to the region of interest from the remaining voxels.

15. The system of claim 11, wherein identifying the vascular voxels in the data set further comprises generating variance data from the time-varying signal of each voxel, the variance data of the data set containing a low-frequency background shift.

16. The system of claim 15, wherein the processor is further configured to correct the variance data of the data set using a median filter to remove the low-frequency background shift.

17. The system of claim 16, wherein the processor is further configured to:
determine an observed cumulative distribution function (CDF) of the variance data set;
model a known probability distribution to a lower segment of the observed CDF to generate an estimate of a threshold CDF; and
determine the variance threshold to correspond to a probability nearly equal to 1 on the first estimate of the threshold CDF.

18. The system of claim 17, wherein the known probability distribution is a normal distribution, a chi-square distribution, or a non-central chi-square distribution.

19. The system of claim 17, wherein the lower segment of the observed CDF corresponds to a segment of the CDF having probability <0.5.

20. The system of claim 17, wherein the probability nearly equal to 1 is a probability in the range of 0.99 to 0.995.

* * * * *